United States Patent [19]

Woods, Jr. et al.

[11] 4,382,437
[45] May 10, 1983

[54] SELF-CONTAINED PASSIVE SOLAR HEATING SYSTEM

[75] Inventors: James E. Woods, Jr.; Eduardo A. B. Maldonado, both of Ames, Iowa

[73] Assignee: Iowa State University Research Foundation, Inc., Ames, Iowa

[21] Appl. No.: 279,854

[22] Filed: Jul. 2, 1981

Related U.S. Application Data

[63] Continuation-in-part of Ser. No. 101,153, Dec. 7, 1979, abandoned.

[51] Int. Cl.³ ............................................. F24J 3/02
[52] U.S. Cl. ................................... 126/433; 126/428; 126/430; 126/431; 165/48 S; 165/104.26
[58] Field of Search ............... 126/433, 430, 436, 428, 126/429, 417, 431; 62/175; 165/104.21, 104.26, 104.33, 18, 39, 48 S

[56] References Cited

U.S. PATENT DOCUMENTS

| | | |
|---|---|---|
| 2,469,496 | 5/1949 | Christenson . |
| 2,544,474 | 3/1951 | Swanson, Jr. . |
| 3,369,540 | 2/1968 | Meckler . |
| 3,387,602 | 6/1968 | Thomason . |
| 3,407,027 | 10/1968 | Bienert et al. . |
| 3,435,889 | 4/1969 | Bienert . |
| 3,672,443 | 6/1972 | Bienert et al. . |
| 3,688,838 | 9/1972 | Sturm et al. . |
| 3,766,977 | 10/1973 | Pravda et al. . |
| 3,799,144 | 3/1974 | Ramsey et al. .................. 126/433 |
| 3,827,480 | 8/1974 | Gammel et al. ................. 165/104.33 |
| 3,919,998 | 11/1975 | Parker . |
| 3,957,107 | 5/1976 | Altoz et al. ....................... 165/32 |
| 3,958,755 | 5/1976 | Cleer, Jr. . |
| 3,960,136 | 6/1976 | Moan et al. . |
| 3,977,601 | 8/1976 | Bearzi . |
| 3,989,032 | 11/1976 | Harrison . |
| 3,991,742 | 12/1976 | Gerber . |
| 3,996,919 | 12/1976 | Hepp ................................. 126/433 |
| 4,000,776 | 10/1977 | Kroebig et al. .................. 165/32 |
| 4,005,297 | 1/1977 | Cleaveland ................. 165/104.26 X |
| 4,010,734 | 3/1977 | Chayet . |
| 4,012,770 | 3/1977 | Pravda et al. . |
| 4,017,028 | 4/1977 | Manor . |
| 4,059,093 | 11/1977 | Knowles et al. .................. 126/433 |
| 4,067,315 | 1/1978 | Fehlner et al. . |
| 4,119,085 | 10/1978 | Knowles et al. . |
| 4,131,158 | 12/1978 | Abhat et al. . |
| 4,184,477 | 1/1980 | Yuan .............................. 165/104.26 |
| 4,273,100 | 6/1981 | Cogliano .......................... 126/433 |

*Primary Examiner*—Larry Jones
*Attorney, Agent, or Firm*—Zarley, McKee, Thomte, Voorhees & Sease

[57] ABSTRACT

A self-contained passive solar heating system includes first and second heat pipes, each having a refrigerant medium therein, a condenser portion and an evaporator portion, with the condenser portion of the first heat pipe being coupled to the evaporator portion of the second heat pipe for transferring heat thereto when the pressure within the first heat pipe is greater than the pressure within the second heat pipe. The evaporator portion of the first heat pipe is adapted to be exposed to a source of heat and the condenser portion of the second heat pipe contacts a medium to be heated. A temperature control mechanism may be installed as the coupling between the first and second heat pipes for uncoupling the same when the temperature within the first heat pipe falls below a predetermined temperature. Also, a third heat pipe may be provided having a thermostatic portion operatively connected to the condenser portion of the second heat pipe by a piston means so that changes in pressure within the thermostatic portion occasioned by changes in temperature of the medium to be heated will cause movement of the pistons to vary the size of the condensing portion of the second heat pipe to increase or decrease the rate of heat transfer to the medium.

22 Claims, 8 Drawing Figures

SELF-CONTAINED PASSIVE SOLAR HEATING SYSTEM

This application is a continuation-in-part application of pending application Ser. No. 101,153, filed Dec. 7, 1979, now abandoned.

BACKGROUND OF THE INVENTION

The present invention relates generally to solar heating systems and more particularly to a self-contained passive solar heating system which utilizes heat pipes to effect the transfer of heat therethrough.

In view of the rising costs and dwindling supplies of conventional non-renewable energy sources such as coal, petroleum and natural gas, there is a need for new alternative heating systems that are technically feasible and economically competitive without depleting our natural resources. The sun affords a vast and virtually inexhaustible source of energy and many such heating systems have been developed to date which employ a solar collector and a storage tank with mechanically forced fluid circulation therebetween. A disadvantage of such systems is the requirement of energy from a conventional source for circulating fluid through the solar collector. Heat pipes have heretofore at least experimentally been employed in solar collectors but no known system has yet been developed wherein solar energy is both collected and transferred to storage by the utilization of heat pipes.

Accordingly, it is a primary object of the present invention to provide an improved self-contained passive solar heating system.

Another object is to collect solar energy and transfer it to a storage unit using one or more heat pipes in a totally passive mode.

Another object is to provide a passive solar heating system wherein heat is transferred from the condenser portion of one heat pipe to the evaporator portion of another heat pipe.

Another object is to provide a passive solar heating system which includes heat pipes having a shape which renders them relatively easy to manufacture and suitable for installation in compact heating system modules.

A related object is to provide a passive solar heating system which includes heat pipes having a generally flat shape.

Another object of the invention is to provide a passive solar heating system which uses heat pipes to collect heat and transfer it to storage with higher efficiency than a conventional active system on cloudy days.

Another object is to provide a passive solar heating system utilizing heat pipes which are coupled in a manner to prevent heat loss from storage due to reverse transfer of heat through the system.

Another object of the invention is to provide a passive solar heating system in which a heat pipe operates as a thermostat to sense the temperature of a medium to be heated and control the rate of heat transfer to the medium.

Finally, an object is to provide a passive solar heating system which is economical to manufacture, simple in construction and efficient in operation.

SUMMARY OF THE INVENTION

The self-contained passive solar heating system of the present invention contemplates both an apparatus and method for collecting solar energy and transferring it to a storage unit using heat pipes in a totally passive mode, i.e., without using any external auxiliary energy source. The heat transfer device of the invention includes first and second heat pipes, each having a refrigerant medium therein and condenser and evaporator portions. The condenser portion of the first heat pipe is coupled to the evaporator portion of the second heat pipe for transferring heat thereto when the pressure within the first heat pipe is greater than the pressure within the second heat pipe. The evaporator portion of the first heat pipe is adapted to be exposed to a source of heat such as direct sunlight and the condenser portion of the second heat pipe is adapted to be exposed to a medium to be heated such as the air within a building structure.

A temperature control device disengageably couples the first and second heat pipes so that when the temperature within the first heat pipe falls below a predetermined temperature, the heat pipes will be automatically thermally uncoupled. Uncoupling of the heat pipes affords a thermal break against heat loss due to reverse heat transfer from the second heat pipe to the first heat pipe. Furthermore, the temperature control device affords practically instantaneous coupling and uncoupling of the heat pipes so as to enable the system to efficiently absorb heat during even brief periods of sunlight on a generally cloudy day. The pipes are only thermally coupled and uncoupled, and are never in fluid communication with each other.

A third heat pipe may be provided having a refrigerant medium therein and a thermostatic portion adapted to be exposed to the medium to be heated. The thermostatic portion of the third heat pipe may be interconnected to a coupling portion of the second heat pipe with a piston slidably sealed therebetween for separating the two portions. When the medium to be heated requires heat, the pressure in the thermostatic portion is less than the pressure within the coupling portion of the second heat pipe with the result that the piston is moved to a position to enlarge the coupling portion and thereby increase the rate of heat transferred to the medium. On the other hand, when the medium reaches the desired temperature, the increase in pressure within the thermostatic portion will cause movement of the piston to decrease the size of the coupling portion and thereby reduce the rate of heat transfer to the medium. In this connection, the second heat pipe may be provided with a storage portion in thermal communication with a heat sink so that energy may be collected and stored for subsequent use as needed.

Finally, the solar heating system of the present invention contemplates providing a unitary module readily adaptable for placement within an opening through a wall of a building structure for automatically heating the interior space thereof in a passive mode. For space efficiency, as well as operational efficiency, the heat pipes of the invention include flat portions which may be arranged in adjacent relation within a solar heating module.

DESCRIPTION OF THE PREFERRED EMBODIMENT

A self-contained passive solar heating module is indicated generally at 10 assembled within an opening 12 of an upright building structure wall 14 at a position below a window 16.

Figure 2:
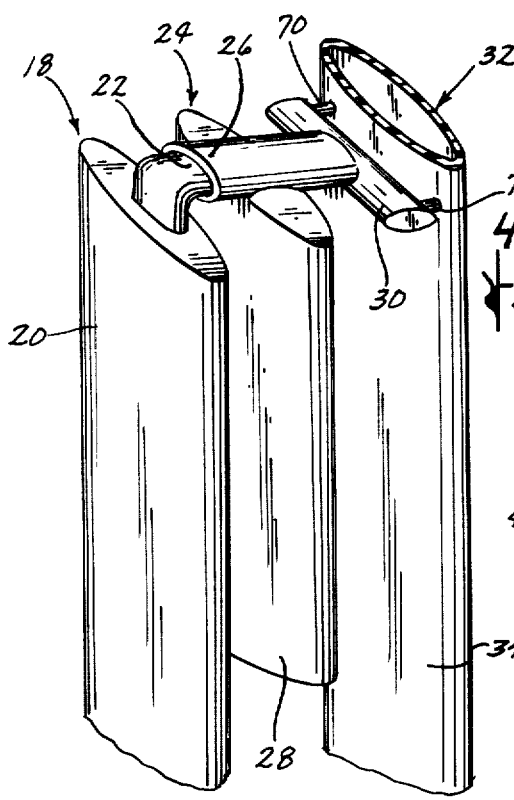
FIG. 2 is an enlarged foreshortened perspective view of the assembled first, second and third heat pipes of the invention.

Referring to FIG. 2, the heat transfer module 10 includes a first heat pipe 18 having an evaporator portion 20 and a condenser portion 22, a second heat pipe 24 having an evaporator portion 26, a storage portion 28 and a condenser or coupling portion 30 and a third heat pipe 32 having a thermostatic portion 34. Each heat pipe is a separate sealed container having a refrigerant medium therein.

Figure 3:
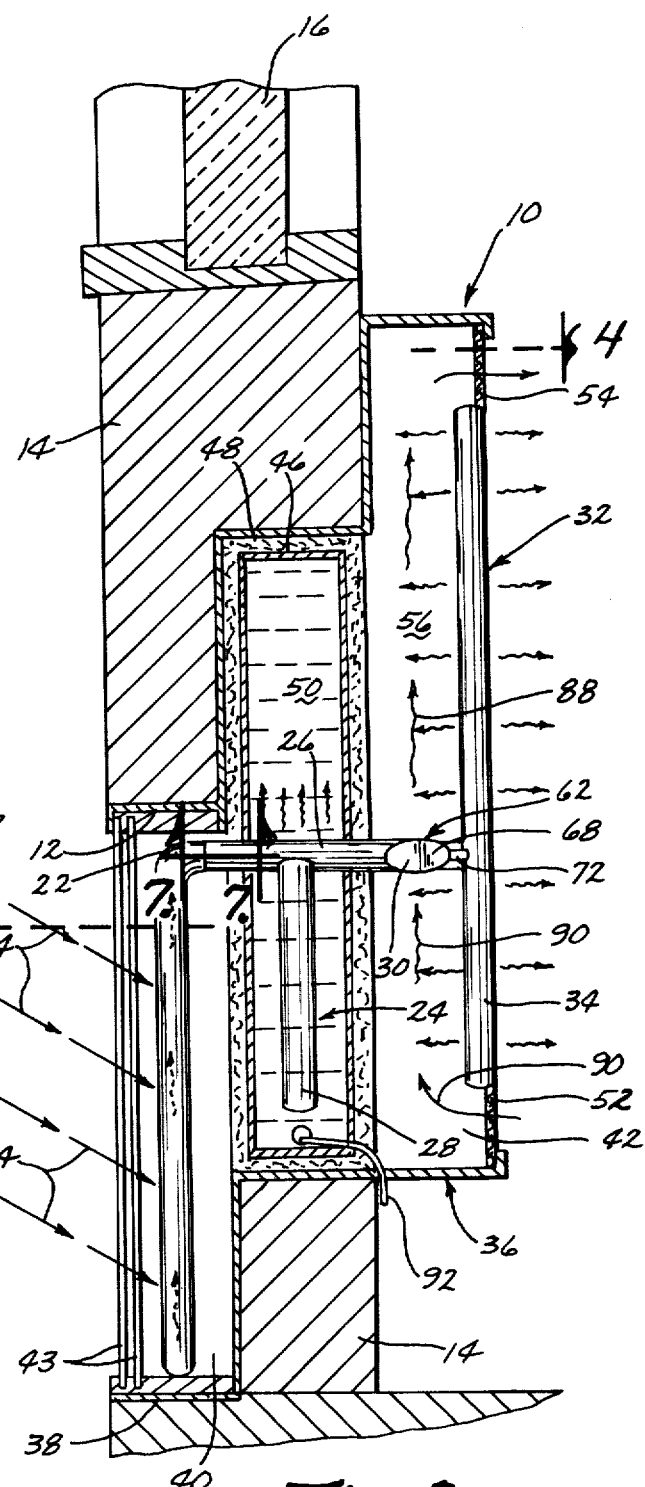
FIG. 3 is an enlarged transverse sectional view of the solar heating module of FIG. 1.

The condenser portion 22 of the first heat pipe 18 is positioned generally perpendicularly to the evaporator portion 20 as seen in FIG. 2. Likewise, the evaporator portion 26 of the second heat pipe 24 is positioned generally perpendicularly to the storage portion 28 so that the condenser portion 22 of the first heat pipe 18 may be coupled in alignment with the evaporator portion 26 of the second heat pipe 24 with the evaporator portion 20 of the first heat pipe and storage portion 28 of the second heat pipe depending therefrom in generally parallel adjacent relation. Similarly, the thermostatic portion 34 of the third heat pipe is arranged in upright relation generally parallel to the storage portion 28 so as to define a compact assembly which may be efficiently arranged within a support frame 36 as shown in FIG. 3 to define a single compact module 10 which may be easily built into a new or existing wall structure 14.

Support frame 36 includes a generally tiered peripheral frame member 38 which defines a lowermost exterior chamber 40, an intermediate storage chamber and an uppermost interior chamber 42. The exterior open side of frame 38 is covered by double pane glass 43 and the evaporator portion 20 of the first heat pipe 18 is exposed to that open side for receiving sun rays as indicated by arrows 44.

The intermediate chamber defined by frame 38 is filled by a heat sink container 46 and the thermal insulation material 48 which completely surrounds it. Container 46 is substantially filled with a heat storage medium 50, possibly bi-phasic materials such as a water and eutectic salt solution, for example. As seen in FIG. 3, the evaporator portion 26 of the second heat pipe 24 is sealed within and extends through both the interior and exterior walls of the heat sink container 46. The storage portion 28 of the second heat pipe 24 is positioned within container 46 so as to be in intimate thermal communication with the heat storage medium 50 therein. The opposite or interior open side of frame 38 is substantially filled by the thermostatic portion 34 of the third heat pipe 32 except for vertically spaced air inlet and air outlet openings 52 and 54 which may be covered with a screen material as shown in FIG. 3.

Thermostatic portion 34 is arranged in spaced relation from storage portion 28 so as to define a convection path 56 therebetween with the coupling portion 30 of the second heat pipe 24 disposed within the convection path 56 for transferring heat thereto at times.

Figure 7:
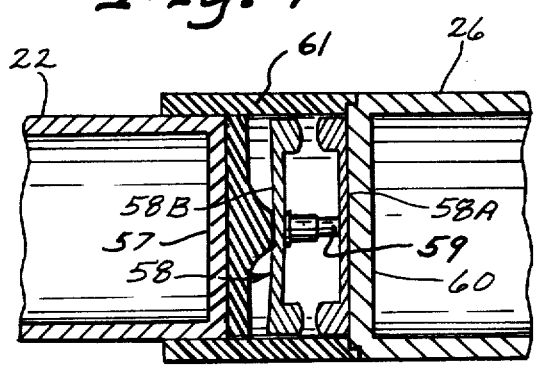
FIG. 7 is an enlarged scale sectional view of the opened coupling means between pipes 22 and 26 in FIG. 3.
Figure 8:
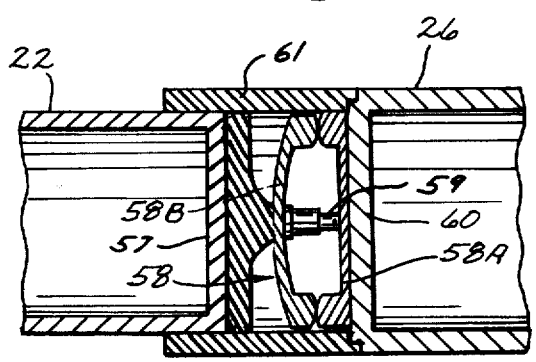
FIG. 8 is a view similar to that of FIG. 7 with the coupling means in a closed condition.

A temperature control device 58 is shown in FIGS. 7 and 8 for coupling together the first and second heat pipes 18 and 24. It can be seen that the evaporator portion 26 of the second heat pipe includes a wall portion 60. The condenser portion 22 of the first heat pipe is received within the portion 26, and is thermally insulated because the only contact between them is through thermal insulator 61. The temperature control device 58 is mounted on the inserted end of condenser portion 22 in physical contact with wall portion 57, and is expandable and contractible into and out of engagement with the interior surface of the wall portion 60. The structural portion 59 of temperature control device 58 is an insulator. The temperature control device 58 senses the temperature with the condenser portion 22 of the first heat pipe. Component 58B is positioned against component 58A and wall 60 (FIG. 8) when 58 is closed. This allows fluid in 22 to be in thermal (not fluid) contact with the fluid in 26 through wall 57, components 58A and 58B, and wall 60. When the temperature therein falls below a predetermined temperature, component 58B contracts (FIG. 7) to disengage from component 58A and wall 60 to break the thermal contact of portion 22 with portion 26. Similarly, the temperature control device expands when the temperature within evaporator portion 20 exceeds a predetermined temperature (FIG. 8). When the temperature control device 58 is expanded (FIG. 8), the condenser portion 22 of the first heat pipe is disposed in direct thermal communication with the evaporator portion 26 of the second heat pipe and when the temperature control device 58 is contracted, the condenser portion 22 becomes disengaged from evaporator portion 26 so as to provide a thermal break to prevent reverse heat transfer from the second heat pipe to the first heat pipe. The temperature control device 58 is commercially available from Texas Instruments under the trademark KLIXON.

Figure 4:
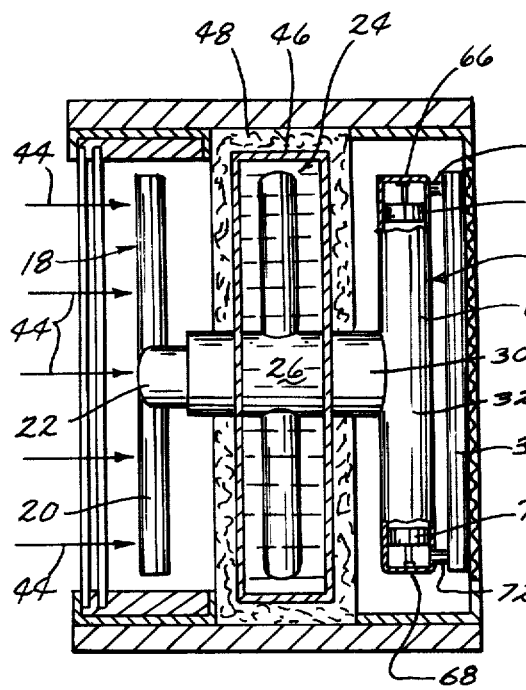
FIG. 4 is a top sectional view of the solar heating module as seen on line 4—4 in FIG. 3.
Figure 6:
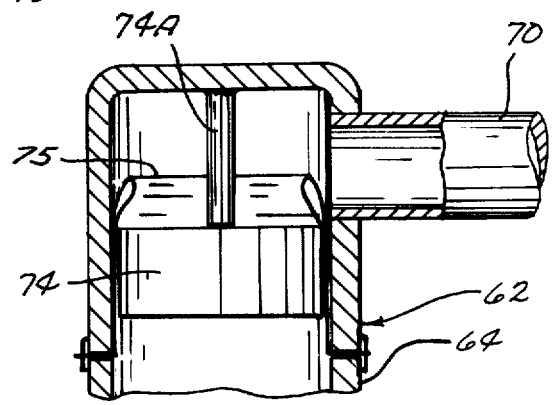
FIG. 6 is an enlarged scale sectional view showing the details of the piston structure of FIG. 4.

The connection between the second and third heat pipes 24 and 32 is shown best in FIG. 4. It can be seen that the coupling portion 30 of the second heat pipe comprises an elongated generally tubular and horizontally extended member 62 having a sidewall 64 and opposite ends 66 and 68. The thermostatic portion 34 of the third heat pipe communicates with the opposite ends of tubular member 62 through conduits 70 and 72 respectively. A pair of pistons 74 are positioned within the tubular member 62 with freedom of sliding movement therein and attached to sidewall 64 through dynamic linear seals 75. The pistons 74 with seals 75 are sealed relative to sidewall 64 so as to prevent any communication of refrigerant medium between the coupling portion 30 and thermostatic portion 34. The dynamic linear seals are commercially available, for example, from the Bellofram Corporation of Burlington, Massachusetts. The positions of pistons 74 within the tubular member 62 are determined by the relative pressures within the thermostatic portion 34 and coupling portion 30 respectively as described in greater detail hereinbelow. Pins 74A (FIG. 6) prevent the pistons from closing the ports 70 and 72.

Figure 5:
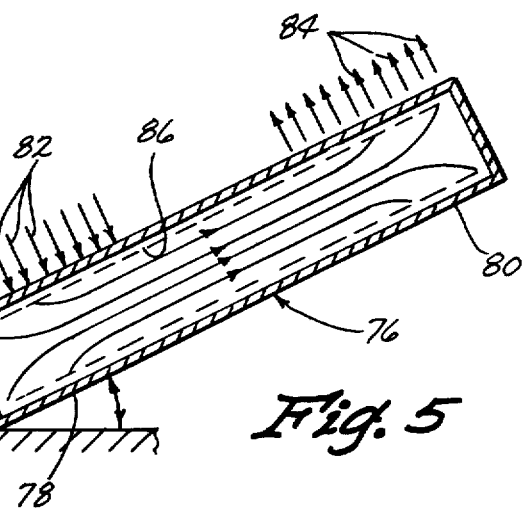
FIG. 5 is a diagrammatic side sectional view of a heat pipe generally.

The operation of a heat pipe generally can be explained with reference to the diagrammatic showing in FIG. 5 wherein the sealed heat pipe 76 is evacuated and partially filled with a working fluid such as water, a refrigerant or even a liquid metal. Heat is transferred from the evaporator end 78 to the condenser end 80 by a closed cycle process of evaporation and condensation. When heat is applied to the evaporator end 78 as indicated by arrows 82, the liquid temperature and pressure increase, causing some of the liquid to evaporate. This increased saturation vapor pressure causes the vapor to flow to the condenser end 80 of the heat pipe where a cooler temperature and a lower saturation vapor pressure exists. As the vapor condenses, the heat of vaporization is released and conducted out of the heat pipe 76 as indicated by arrows 84. Since the latent heat of all fluids is very large, small mass transport can result in large transport of heat. The condensed liquid returns to the evaporator end 78 through the wick 86 by capillary action. Heat pipes are particularly suited for the solar heating system of the invention because thermal energy can be transferred from one end of a heat pipe to the other at higher rates than the best metallic conductor and under conditions of only a small temperature gradient.

Figure 1:
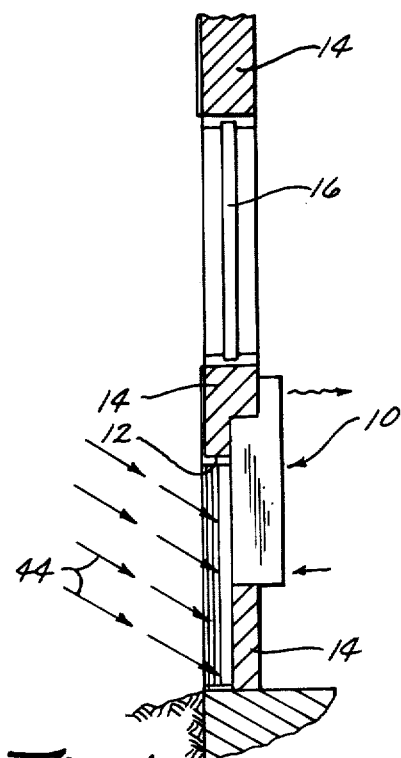
FIG. 1 is a transverse sectional view of a solar heating module according to the invention as installed in a building wall below a window.

In operation, the solar heating module 10 of the present invention is installed in a wall structure 14 as shown in FIG. 1 with the first heat pipe 18 exposed to the sun as the source of heat and the thermostatic portion 34 exposed to the interior room air. The sun's rays warm the evaporator portion 20 of the first heat pipe thereby vaporizing the refrigerant therein and causing the vaporized refrigerant to move to the condenser portion 22. The temperature control device 58 is preferably selected so as to expand into thermal coupling engagement (not fluid coupling) with the evaporator portion 26 of the second heat pipe when the temperature within the evaporator portion 20 of the first heat pipe is sufficient to cause vaporization in the evaporator section 26 of the second heat pipe. The condenser portion 22 of the first heat pipe is thus in intimate thermal communication with the cooler evaporator portion 26 of the second heat pipe with the result that the latent heat released by condensation within condenser portion 22 is transferred to evaporator portion 26. Assuming that the room requires heat, the refrigerant which is vaporized within evaporator portion 26 is transferred to the cooler coupling portion 30 which is disposed within the convection path 56 in communication with the room air. As vapor condenses within the coupling portion 30, heat is released to the air within the convection path 56 which thereby sets up a convection current upwardly out of the supply air outlet 54 as indicated by arrows 88 in FIG. 3, thereby drawing air into the return air grille 52 as indicated by arrows 90.

When the room requires heat, the refrigerant medium in the thermostatic portion 34 condenses and the pressure in portion 34 decreases, causing the pistons 74 in the coupling portion 30 to retract toward the end of the tubular member 62 under the force of the greater pressure within the coupling portion 30. Accordingly, the size of the coupling portion 30 is increased so as to maximize heat transfer to the room air. As the room air temperature increases toward the desired value, the refrigerant medium in the thermostatic portion 34 will vaporize and the pressure in portion 34 will increase, thereby forcing the pistons 74 toward the center of the tubular member 62. Accordingly, the coupling portion 30 is decreased in size with the result that less condenser area will become available to dissipate heat to the air stream in convection path 56. Heat transferred to the room will then decrease such that condensation of fluid in the second heat pipe 24 will then be forced to occur in the storage portion 28. Unneeded heat is thus transferred to and stored within the preferably bi-phasic heat storage medium 50.

When insolation is not available such as in the evenings or on very cloudy days, the temperature within the evaporator portion 20 of the first heat pipe may be less than the temperature within the storage portion 28 of the second heat pipe with the result that the pressure within the evaporator portion 26 of the second heat pipe will be greater than the pressure within the condenser portion 22 of the first heat pipe. In this event, heat transfer cannot take place from the first heat pipe 18 to the second heat pipe 24, as the temperature control device 58 operatively contracts to uncouple the first and second heat pipes so as to prevent heat loss due to reverse heat flow from storage to the first heat pipe 18. If the room requires heat at such times, the storage portion 28 acts as the evaporator to transfer heat to the coupling portion 30 in the manner described above. If the stored heat in the storage medium 50 is depleted, it may be restored or recharged by an auxiliary electric resistance heating element 92 as shown in FIG. 3.

Whereas the preferred embodiment has been shown as adapted for heating the room air within a building, it is to be understood that other embodiments may be readily adapted for heating such other mediums as water or the like by the same natural passive convection flow as described above. Furthermore, it is apparent that there has been disclosed a novel method of transferring heat, basically including the steps of coupling the condenser portion of a first heat pipe in thermal communication with the evaporator portion of a second heat pipe, exposing the evaporator portion of the first heat pipe to a source of heat and exposing the condenser portion of the second heat pipe to a medium cooler than the source of heat thereby transferring heat from the condenser portion of the first heat pipe to the evaporator portion of the second heat pipe and from the condenser portion of the second heat pipe to the medium to be heated. Further steps may include upcoupling the first heat pipe in response to a decrease in temperature within the first heat pipe below a predetermined temperature and arranging a storage portion of the second heat pipe in thermal communication with an insulated heat sink. The method further contemplates providing a third heat pipe having a thermostatic portion, exposing the thermostatic portion to the medium to be heated, and increasing and decreasing the size of the condenser portion of the second heat pipe in response to pressure decreases and increases respectively within the thermostatic portion occasioned by decreases and increases in the temperature of the medium to be heated.

Whereas, the self-contained passive solar heating module of the invention has been shown as installed below a window, the modules may be located remotely from any window openings. Furthermore, a plurality of modules may be arranged in cascading or overlapping stacked relation for increasing the heat generating capacity at a particular location.

Thus there has been shown and described a self-contained passive solar heating system which accomplishes at least all of its stated objects.

What is claimed is:

1. A heat transfer device, comprising,
   a first heat pipe having a refrigerant medium therein and having a condenser portion and an evaporator portion, said evaporator portion being exposed to a source of solar heat, a second heat pipe having a refrigerant medium therein and having a condenser portion and an evaporator portion, the condenser portion of said first heat pipe being coupled to the evaporator portion of said second heat pipe for transfer of heat from the condenser portion of said first heat pipe to the evaporator portion of said second heat pipe when the pressure within said first heat pipe is greater than the pressure within said second heat pipe, a third heat pipe coupled to said second heat pipe, said third heat pipe including a refrigerant medium therein and a thermostatic portion in contact with the ambient medium of an area to be heated, and said second heat pipe having a coupling portion in contact with said ambient medium for transferring heat thereto at times.

2. The device of claim 1 wherein said first heat pipe is adapted to be exposed to and to absorb solar radiation and said second heat pipe has means in contact with a medium to be heated.

3. The device of claim 1 wherein a temperature control means couples said first and second heat pipes, said temperature control means adapted to uncouple said first heat pipe and said second heat pipe at a predetermined temperature level.

4. The device of claim 3 wherein the evaporator portion of said second heat pipe includes a generally sleeve-shaped portion and the condenser portion of said first heat pipe is received within said sleeve-shaped portion of the second heat pipe.

5. The device of claim 4 wherein said temperature control means is expandable and contractable and arranged in thermal communication with the condenser portion of said first heat pipe so as to contract when the temperature of said first heat pipe falls below said predetermined temperature, said temperature control means, when expanded, being engageable with said sleeve-shaped portion of the second heat pipe to thermally couple said first and second heat pipes and, when contracted, being disengaged from said sleeve-shaped portion of the second heat pipe, thereto to resist heat transfer from said second heat pipe to said first heat pipe.

6. The device of claim 1 further comprising a heat sink means, said second heat pipe including a storage portion arranged in thermal communication with said heat sink means for storing thermal energy which said second heat pipe has received from said first heat pipe.

7. The device of claim 6 wherein the evaporator portion of said second heat pipe is positioned generally perpendicularly to the storage portion thereof and said condenser portion of said first heat pipe being positioned generally perpendicularly to the evaporator portion thereof, said condenser portion of said first heat pipe and evaporator portion of said second heat pipe being coupled in alignment with one another and said evaporator portion of said first heat pipe and storage portion of said second heat pipe being arranged in generally parallel adjacent relation.

8. The device of claim 6 wherein said heat sink means includes a container, means for thermally insulating said container from the surrounding environment and a heat storage medium within said container, said storage portion of the second heat pipe being arranged in thermal communication with said heat storage medium.

9. The device of claim 8 wherein said storage portion of said second heat pipe is positioned within said container.

10. The device of claim 1 wherein said first and second heat pipes each comprise an elongated housing having a wick means positioned therein to convey refrigerant medium, each housing having a width substantially greater than the thickness thereof.

11. A method of passively transferring solar heat, comprising, providing first and second heat pipes, each having a refrigerant medium therein, an evaporator portion and a condenser portion, coupling the condenser portion of said first pipe in thermal communication with the evaporator portion of said second heat pipe, providing a third heat pipe having a refrigerant medium therein and a thermostatic portion, exposing the evaporator portion of said first heat pipe to a source of solar heat, exposing the condenser portion of the second heat pipe to a medium cooler than said source of heat thereby transferring heat from the condenser portion of said first heat pipe to the evaporator portion of said second heat pipe and from the condenser portion of said second heat pipe to said medium, exposing said thermostatic portion of the third heat pipe to said medium to be heated, and increasing the size of said condenser portion of the second heat pipe in response to a decrease in pressure in said thermostatic portion occasioned by a decrease in the temperature of said medium, thereby increasing the rate of heat transfer to said medium.

12. The method of claim 11 further comprising sensing the temperature within said first heat pipe and uncoupling the condenser portion of said first heat pipe from the evaporator portion of the second heat pipe in response to a decrease in temperature within said first heat pipe below a predetermined temperature.

13. The method of claim 12 further comprising recoupling the condenser portion of said first heat pipe with the evaporator portion of said second heat pipe in response to an increase in temperature within said first heat pipe above said predetermined temperature.

14. The method of claim 11 wherein said second heat pipe has a storage portion and further comprising arranging said storage portion in thermal communication with an insulated heat sink.

15. The method of claim 11 further comprising reducing the size of the condenser portion of the second heat pipe in response to an increase in pressure in said thermostatic portion occasioned by an increase in temperature of said ambient air, thereby decreasing the rate of heat transfer to said medium.

16. A heat transfer device, comprising, a first heat pipe having a refrigerant medium therein and having a condenser portion and an evaporator portion, a second heat pipe having a refrigerant medium therein and having a condenser portion and an evaporator portion, the condenser portion of said first heat pipe being coupled to the evaporator portion of said second heat pipe for transfer of heat from the condenser portion of said first heat pipe to the evaporator portion of said second heat pipe when the pressure within said first heat pipe is greater than the pressure within said second heat pipe, a third heat pipe coupled to said second heat pipe, said third heat pipe including a refrigerant medium therein and a thermostatic portion in contact with the ambient medium of an area to be heated, said second heat pipe having a coupling portion in contact with said ambient medium for transferring heat thereto at times, and piston means between said thermostatic portion of said third heat pipe and said coupling portion of said second heat pipe whereby changes in pressure within said thermostatic portion occasioned by changes in temperature of said medium will cause movement of said piston means to change the pressure within said coupling portion, whereby said thermostatic portion will determine the position of said pistons and hence the effective size of said coupling portion to vary the quantity of heat transferred from said coupling portion to said medium.

17. The device of claim 16 wherein said coupling portion is in communication with the evaporator portion and storage portion of said second heat pipe.

18. The device of claim 16 wherein said coupling portion comprises an elongated generally tubular member having a sidewall and opposite ends, said piston means being sealed relative to said sidewall and longitudinally slidable within said tubular member, and further comprising conduit means establishing communication between at least one end of said tubular member and said thermostatic portion of said third heat pipe.

19. The device of claim 18 wherein said tubular member is positioned with the longitudinal axis thereof arranged generally horizontally.

20. The device of claim 18 wherein said piston means comprises a pair of pistons slidably supported within said tubular member, said conduit means establishing communication between said thermostatic portion and both ends of said tubular member, and said sidewall having an opening between said pistons for communication of refrigerant medium between the evaporator portion and coupling portion of said second heat pipe.

21. The device of claim 16 further comprising a support frame having opposite open sides, means for supporting said first, second and third heat pipes within said support frame with said evaporator portion of said first heat pipe exposed to one of said open sides and said thermostatic portion of said third heat pipe exposed to the other open side.

22. The device of claim 21 wherein said thermostatic portion of said third heat pipe is arranged in spaced relation from said storage portion of said second heat pipe to define a convection path therebetween, said convection path being in communication with said other open side at vertically spaced positions and said coupling portion of said second heat pipe being positioned within said convection path.

* * * * *